(12) United States Patent
Fortuny-Guasch

(10) Patent No.: US 8,466,834 B2
(45) Date of Patent: Jun. 18, 2013

(54) RADAR-IMAGING OF A SCENE IN THE FAR-FIELD OF A ONE- OR TWO-DIMENSIONAL RADAR ARRAY

(75) Inventor: Joaquim Fortuny-Guasch, Taino (IT)

(73) Assignee: The European Union, Represented by the European Commission (BE)

( * ) Notice: Subject to any disclaimer, the term of this patent is extended or adjusted under 35 U.S.C. 154(b) by 163 days.

(21) Appl. No.: 12/992,767

(22) PCT Filed: May 4, 2009

(86) PCT No.: PCT/EP2009/055359
§ 371 (c)(1),
(2), (4) Date: Feb. 14, 2011

(87) PCT Pub. No.: WO2009/138333
PCT Pub. Date: Nov. 19, 2009

(65) Prior Publication Data
US 2011/0140954 A1  Jun. 16, 2011

(30) Foreign Application Priority Data

May 15, 2008 (EP) .................................... 08156238

(51) Int. Cl.
*G01S 13/00* (2006.01)

(52) U.S. Cl.
USPC ........ 342/179; 342/25 R; 342/25 A; 342/195; 342/196

(58) Field of Classification Search
USPC ................ 342/25 R, 25 A, 25 B, 25 C, 25 D, 342/25 E, 25 F, 156, 179, 195, 196
See application file for complete search history.

(56) References Cited

U.S. PATENT DOCUMENTS 4,602,257 A * 7/1986 Grisham ...................... 342/25 F
4,617,567 A * 10/1986 Chan ............................ 342/25 A (Continued)

OTHER PUBLICATIONS

A. Averbuch, R.R. Coiffman, D.L. Donoho, M. Elad and M. Israeli, •Fast and Accurate Polar Fourier Transform, Appl. Comput. Harm. Anal. 21 (2006) 145-167.

(Continued)

*Primary Examiner* — Jack W Keith
*Assistant Examiner* — Peter Bythrow
(74) *Attorney, Agent, or Firm* — Cantor Colburn LLP

(57) ABSTRACT

A method of radar-imaging a scene in the far-field of a one-dimensional radar array, comprises providing an array of backscatter data $D(f_m, x'n)$ of the scene, these backscatter data being associated to a plurality of positions $x'_n$, $n=0 \ldots N-1$, $N>1$, that are regularly spaced along an axis of the radar array. The backscatter data for each radar array position x'n are sampled in frequency domain, at different frequencies $f_m$, $m=0 \ldots M-1$, $M>1$, defined by $f_m=f_c-B/2+m\cdot\Delta f$, where $f_c$ represents the center frequency, B the bandwidth and $\Delta f$ the frequency step of the sampling. A radar reflectivity image 1 ($\alpha_{m'}, \beta_{n'}$) is computed in a pseudo-polar coordinate system based upon the formula (2) with formula (3) where j represents the imaginary unit, formula (A) is the baseband frequency, FFT2D denotes the 2D Fast Fourier Transform operator, $\alpha_{m'}$, m'=0 ... M-1, and $\beta_{n'}$, n'=0 ... N-1 represent a regular grid in the pseudo-polar coordinate system, and $P_{max}$ is chosen >0 depending on a predefined accuracy to be achieved. A corresponding method of radar-imaging a scene in the far-field of a two-dimensional radar array is also proposed.

$$I(\alpha_{m'}, \beta_{n'}) = \sum_{p=0}^{P_{max}} I_p(\alpha_{m'}, \beta_{n'}), \quad \text{Formula (2)}$$

$$I(\alpha_{m'}, \beta_{n'}) = \frac{1}{p!}\left[\frac{-j2\pi\beta_{n'}}{f_c}\right]^p FFT2D\left[D(f_m, x'_n)(\hat{f}_m, x'_n)^p\right], \quad \text{Formula (3)}$$

$$\hat{f}_m = -B/2 + m\cdot\Delta f \quad \text{Formula (A)}$$

16 Claims, 5 Drawing Sheets

U.S. PATENT DOCUMENTS

| | | | | |
|---|---|---|---|---|
| 4,924,229 | A * | 5/1990 | Eichel et al. | 342/25 E |
| 5,341,141 | A * | 8/1994 | Frazier et al. | 342/59 |
| 5,745,069 | A * | 4/1998 | Gail | 342/25 F |
| 7,482,967 | B2 * | 1/2009 | Beharrell | 342/20 |
| 2003/0052813 | A1 * | 3/2003 | Natsume | 342/70 |
| 2005/0073455 | A1 * | 4/2005 | Chow et al. | 342/25 F |
| 2007/0090988 | A1 * | 4/2007 | Beharrell | 342/13 |
| 2007/0109177 | A1 * | 5/2007 | Baath et al. | 342/124 |
| 2007/0188371 | A1 * | 8/2007 | Callison | 342/25 A |
| 2010/0149024 | A1 * | 6/2010 | Connell et al. | 342/25 F |

OTHER PUBLICATIONS

A. Averbuch, R. R. Coifman, D. L. Donoho, M. Israeli, and Y. Shkolnisky, "A framework for discrete integral transformations I—the pseudopolar Fourier transform," SIAM Journal on Scientific Computing, vol. 30, No. 2, pp. 764-784, 2008.

A. Martinez-Vazquez, J. Fortuny-Guasch, and U. Gruber, "Monitoring of the snow cover with a ground-based synthetic aperature radar," European Association of Remote Sensing Laboratories—EAReL eProceedings, vol. 4, No. 2, pp. 171-178, 2005.

D. Leva, G. Nico, D. Tarchi, J. Fortuny-Guasch, and A.J. Sieber, "Temporal analysis of a landslide by means of a ground-based SAR interferometer", IEEE Trans, on Geoscience and Remote Sensing, vol. 41, pp. 745-752, Apr. 2003.

D. Tarchi, N. Casagli, S. Moretti, D. Leva, and A.J. Sieber, "Monitoring landslide displacements by using ground-based synthetic aperature radar interferometry: Application to the Ruinon landslide in the Italian Alps," AGU Journal of Geophysical Research: Solid Earth, vol. 108, No. 8, 2003.

F. J. Harris, "On the use of windows for harmonic analysis with the discrete Fourier transform," Proceedings of the IEEE, vol. 66, pp. 172-204, Jan. 1978.

G. Antonello, N. Casagli, P. Farina, D. Leva, G. Nico, A.J. Sieber, and D. Tarchi, "Ground-based SAR interferometry for monitoring mass movements," Landslides, Journal of the International Consortium on Landslides, Springer, vol. 1, No. 1, pp. 21-28, 2004.

H. Choi and D. C. Munson, Jr., "Direct-Fourier reconstruction in tomography and synthetic aperture radar," International Journal of Imaging Systems and Technologies, vol. 9, pp. 1-13, Jan. 1998.

J. L. Walker, "Range-Doppler imaging of rotating objects," IEEE Trans. on Aerospace and Electronic Systems, vol. 16, pp. 23-52, Jan. 1980.

J. M. Lopez-Sanchez and J. Fortuny, "3-D Radar imaging using range migration techniques," IEEE Trans. on Antennas and Propagation, vol. 48, pp. 728-737, May 2000.

M. Frigo and S. G. Johnson, "The design and implementation of FFTW3," Proceedings of the IEEE, vol. 93, No. 2, pp. 216-231, 2005. special issue on "Program Generation, Optimization, and Platform Adaptation".

R. Bamler, "A comparison of range-Doppler and wavenumber domain SAR focusing algorithms," IEEE Trans, on Geoscience and Remote Sensing, vol. 30. pp. 706-713, Jul. 1992.

R. M. Mersereau and A. V. Oppenheim, "Digital reconstruction of multidimensional signal from their projections," Proceedings of the IEEE, vol. 62, pp. 1319-1338, Oct. 1974.

US Federal Communications Commission, Report FCC 02-48A1—Revision of Pan 15 of the Commission's Rules Regarding Ultra-Wideband Transmission Systems, Feb. 2002.

Y. S. Y. Keller and A. Averbuch, "Volume registration using the 3-D pseudopolar Fourier transform," IEEE Trans. on Signal Processing, vol. 54, pp. 4323-4331, Nov. 2006.

Averbuch, et al.: "Fast and accurate Polar Fourier transform" Applied and Computational Harmonic Analysis, Academic Press, Inc, US, vol. 21, No. 2, Sep. 1, 2006, pp. 145-167, XP005631947.

Fortuny-Guasch J. et al: "Termporal analysis of a landslide by means of a ground-based SAR interferometer" IEEE Transactions on Geoscience and Remote Sensing, IEEE Service Center, Piscataway, NJ, US, vol. 41, No. 4, Apr. 1, 2003, pp. 745-752, XP011097169.

International Search Report; PCT/EP2009/055359; Jun. 29, 2009.

Jack L. Walker: "Range-Doppler Imaging of Rotating Objects" IEEE Transactions on Aerospace and Electronic Systems, IEEE Service Center, Piscataway, NJ, US, vol. AES-10, No. 1, Jan. 1980, pp. 23-52, XP011166645.

Keller Y; Shkolnisky Y; Averbuch A: "Volume registration using the 3-D pseudopolar Fourier transform" IEEE Transactions on Signal Processing, IEEE Service Center, Piscataway, NJ, US vol. 54, No. 11, Nov. 2006, pp. 4323-4331, XP002497498.

Mankum Xu, et al. "An improved fast fourier transform in polar coordinate system" Intelligent Transportation Systems, 2003. Proceedings 2003 IEEE Oct. 12-15, 2003 Piscataway, NJ USA, IEEE, vol. 2, Oct. 12, 2003, pp. 1735-1739, XP010672718.

* cited by examiner

RADAR-IMAGING OF A SCENE IN THE FAR-FIELD OF A ONE- OR TWO-DIMENSIONAL RADAR ARRAY

TECHNICAL FIELD

The present invention generally relates to radar-imaging a scene located in the far-field of a radar aperture, more particularly to a method for converting a radar image from raw radar data.

BACKGROUND

The present invention is applicable for image reconstruction from radar data acquired by a synthetic aperture radar (SAR) or by a physical radar array. SAR is a well-known and well-developed technique to produce high-resolution images. A large number of imaging algorithms are operationally used in different civilian and military application domains. A common requirement for such algorithms is that of producing imagery with the highest possible resolution. It is well known that the limits of the resolution in range and cross-range are, respectively, dictated by the frequency bandwidth and the physical dimension of the radar aperture. In practice, a criterion to assess the optimality of a SAR system is to compare the achieved cross-range resolution in the imagery with the physical dimension of the radar's antenna. As an example, in strip-map SAR, the cross-range resolution cannot be finer than a half of the physical antenna aperture size. A major part of the radar imaging algorithms presently in use have been conceived for SAR systems with an optimal aperture length. To date, the interest in radar imaging systems with sub-optimal aperture lengths has been very limited. The focus of this invention is on the problem of implementing a fast and accurate imaging algorithm with a highly sub-optimal aperture length, e.g. in a radar system having an aperture length of a few meters and illuminating an image scene spanning a few square kilometers located within the far-field of the radar aperture. This scenario is quite different from those of space-borne and air-borne SAR. In particular, the imaging algorithms used with optimal aperture lengths (typically a few tens of kilometers long in case of space-borne SAR), such as the range migration and chirp-scaling algorithms, do not satisfy certain requirements encountered with a sub-optimal radar aperture. The polar format or range-Doppler algorithm was also discarded because of the geometric distortion caused by it in the imagery. This algorithm can only be used with image extents much smaller than the range to the center of the scene and, therefore, is not appropriate for all interesting scenarios. In, Averbuch et al. disclose a method for manipulating the Fourier transform in Polar coordinates, which uses as a central tool a so-called pseudo-polar FFT, where the evaluation frequencies lie in an oversampled set of nonangularly equispaced points. The pseudo-polar transform plays the role of a nearly-polar system from which conversion to polar coordinates uses processes relying only on 1D FFTs and interpolation operations.

An example application field for a sub-optimal imaging radar is that of ground-based SAR (GB-SAR), which is presently used to monitor the displacement of landslides with sub-millimeter accuracy. In the last ten years, the Joint Research Centre of the European Commission has been a pioneer of this technology and has carried out a vast number of field campaigns that have demonstrated its operational use. This activity has resulted into a massive archive of GB-SAR data with more than 300,000 sets of raw data collected in various sites. Typically, a site monitored on a permanent basis with one of our GB-SAR instruments produces a total of 35,000-40,000 sets of raw data in an entire year. A motivation of this work comes from the need to have a computationally efficient and accurate GB-SAR processing chain to cope with this huge volume of data.

BRIEF SUMMARY

The present invention provides a method of radar-imaging a scene, which can be implemented in a computationally efficient way.

The method according to the invention comes with two variants, directed to the "two-dimensional" ("2D") case and the "three-dimensional" ("3D") case, respectively. Both variants are comprise the computation of a radar reflectivity image based upon an image series expansion. In the first variant, the raw radar data stem from a one-dimensional radar array, whereas, in the second variant, they stem from a two-dimensional radar array. In both variants of the method, the radar array may be a synthetic aperture radar array or a physical radar array. In both variants, the scene of interest to be imaged lies in the far-field of the radar array. This may be expressed mathematically as:

$$\rho > \frac{2L_x^2}{\lambda_c} \text{ and } \rho > \frac{2L_y^2}{\lambda_c}, \qquad (1)$$

where $\rho$ denotes the distance from the centre of the radar array to an arbitrary point within the scene of interest, $L_x$ the length of the radar array along its first axis and $L_y$ the length of the radar array along its second axis (in case of a 2D radar array), and $\lambda_c$ the centre wavelength of the radar.

Turning to the first variant, a method of radar-imaging a scene in the far-field of a one-dimensional radar array, comprises providing an array of backscatter data $D(f_m, x'_n)$ of the scene, these backscatter data being associated to a plurality of positions $x'_n$, $n=0 \ldots N-1$, $N>1$, that are regularly spaced along an axis of the radar array. The backscatter data for each radar array position $x'_n$ are sampled in frequency domain, at different frequencies $f_m$, $m=0 \ldots M-1$, $M>1$, defined by $f_m = f_c - B/2 + m \cdot \Delta f$, where $f_c$ represents the center frequency, $B$ the bandwidth and $\Delta f$ the frequency step of the sampling. According to the present variant of the invention, a radar reflectivity image $I(\alpha_{m'}, \beta_{n'})$ is computed in a pseudo-polar coordinate system based upon the formula:

$$I(\alpha_{m'}, \beta_{n'}) = \sum_{p=0}^{P_{max}} I_p(\alpha_{m'}, \beta_{n'}), \qquad (2)$$

with $$I_p(\alpha_{m'}, \beta_{n'}) = \frac{1}{p!} \left[ \frac{-j2\pi\beta_{n'}}{f_c} \right]^p FFT2D\left[ D(f_m, x'_n)(\hat{f}_m x'_n)^p \right], \qquad (3)$$

where
- $j$ represents the imaginary unit,
- $\hat{f}_m = -B/2 + m \cdot \Delta f$ is the baseband frequency,
- FFT2D denotes the 2D Fast Fourier Transform operator,
- $\alpha_{m'}$, $m'=0 \ldots M-1$, and $\beta_{n'}$, $n'=0 \ldots N-1$ represent a regular grid in the pseudo-polar coordinate system,
- and $P_{max}$ is chosen $\geq 0$ depending on a predefined accuracy to be achieved;

or any mathematically equivalent formula.

Those skilled will appreciate that the present invention uses a series expansion for approximating the reflectivity image in a pseudo-polar coordinate system, i.e. the different terms of the series are computed up to the predefined order $P_{max}$ and these terms are then summed up (if $P_{max} \geq 1$). In the following the method is going to be referred to in brief as the far-field pseudo-polar format algorithm, abbreviated FPFA. In practice, a zeroth order series may be sufficient for obtaining a good approximation of the reflectivity on the pseudo-polar grid. In this case, $P_{max}=0$ and thus $$I(\alpha_{m'},\beta_{n'}) \approx FFT2D[D(f_m,x'_n)] \qquad (4)$$

In the particular case of using just the zeroth order series expansion, the computational cost of the FPFA is O(N M $\log_2$M), which is the lowest possible value one could expect for such an imaging algorithm. As an example, with n=N=M=2048, the FPFA has a computational cost three orders of magnitude lower than that of the time-domain back-propagation algorithm (TDBA), and six orders of magnitude lower than that of the frequency-domain back-propagation algorithm (FDBA). The benefit of using the FPFA is thus evident. It shall be noted that the addition of more terms in the series expansion, being all of them evaluated with 2-D FFT transforms, is straightforward and does not increase the computational cost significantly. The benefit of using the FPFA is thus evident.

According to an advantageous implementation of the FPFA, the individual terms of the image series are evaluated concurrently and separately (e.g. using a parallel multi-processor system).

The radar array positions are preferably defined by $x'_n = -L_x/2 + n \cdot \Delta x'$, where $L_x$ represents a length of the radar array and $\Delta x'$ the spacing between the radar array positions.

The pseudo-polar coordinate system is implicitly determined by the Fourier transform, the array positions $x'_n$ and the frequencies $f_m$. With an appropriate choice of the origin of the pseudo-polar coordinate system, the points $\alpha_{m'}$, m'=0 ... M-1 and $\beta_{n'}$, n'=0 ... N-1, of the regular grid in the pseudo-polar coordinate system may, for instance, be expressed by $\alpha_{m'}$=m'/B, m'=0 ... M-1 and $\beta_{n'}$=n'/$L_x$-(N-1)/(2$L_x$), n'=0 ... N-1. More details on the concept of pseudo-polar grids can be found in and. More recently, a technique that implements a 2-D polar FFT using a pseudo-polar grid has been presented in and.

The order $P_{max}$ of the series expansion is preferably chosen depending on the ratio of radar array length $L_x$ to range resolution. Range resolution $\delta_r$ is given by $\delta_r$=c/(2B), where c denotes the speed of light. As a rule of thumb, the larger the ratio $L_x/\delta_r$, the more terms one preferably uses in the series to guarantee the accuracy of the reflectivity image. An interesting observation is that the number of terms does not depend on the center frequency of the radar.

Preferably, subsequent computation steps using the reflectivity image are carried out in the pseudo-polar coordinate system, e.g. the computation of a coherence image and/or a 2D phase interferogram. Most preferably, a transformation of the reflectivity image, the coherence image and/or the 2D phase interferogram into a coordinate system that is more convenient for visualizing the information, e.g. a polar or Cartesian coordinate system, is carried out only after the substantial computations (of the reflectivity image, the coherence image and/or the 2D phase interferogram) have been achieved in the pseudo-polar coordinate system. In this way, errors introduced into the data through the mapping of the computed image onto a polar or Cartesian grid by interpolation or any other suitable procedure only affect the visualization but not the substantial calculations. A further advantage of the present method is that, in contrast to previous radar imaging methods, no computationally costly interpolation is required before any Fourier transform. This represents an important advantage, for instance, over the so-called range-migration algorithm, which uses a matched filter and Stolt interpolation to represent the radar backscatter data on a regular grid in special frequency domain, before these are Fourier transformed directly into a reflectivity image in a regular grid in a Cartesian coordinate system.

Turning to the second variant of the invention, a method of radar-imaging a scene in the far-field of a two-dimensional radar array, comprises providing an array of backscatter data $D(f_m, x'_n, y'_k)$ of the scene, these backscatter data being associated to a plurality of positions $(x'_n, y'_k)$ n=0 ... N-1, N>1, k=0 ... K-1, K>1, regularly spaced along a first and a second axis of the radar array. The backscatter data for each radar array position $(x'_n, y'_k)$ are sampled in frequency domain, at different frequencies $f_m$, defined by $f_m = f_c - B/2 + m \cdot \Delta f$, where $f_c$ represents again the center frequency, B the bandwidth and $\Delta f$ the frequency step of the sampling. A radar reflectivity image $I(\alpha_{m'}, \beta_{n'}, \gamma_{k'})$ is computed in a pseudo-spherical coordinate system according to the formula:

$$I(\alpha_{m'}, \beta_{n'}, \gamma_{k'}) = \sum_{p=0}^{P_{max}} I_p(\alpha_{m'}, \beta_{n'}, \gamma_{k'}), \qquad (5)$$

with $$I_p(\alpha_{m'}, \beta_{n'}, \gamma_{k'}) = \left[\frac{-j2\pi}{f_c}\right]^p \sum_{q=0}^{p} \frac{\beta_{n'}^q \gamma_{k'}^{p-q}}{q!(p-q)!} FFT3D[D(f_m, x'_n, y'_k) \hat{f}_m^p x_n'^q y_k'^{p-q}], \qquad (6)$$

where
j represents the imaginary unit,
$f_m = -B/2 + m \cdot \Delta f$,
FFT3D denotes a 3D Fast Fourier Transform operator,
$\alpha_{m'}$, m'=0 ... M-1, $\beta_{n'}$, n'=0 ... N-1 and $\gamma_{k'}$, k=0 ... K-1, represent a regular grid in the pseudo-spherical coordinate system,
and $P_{max}$ is chosen $\geq 0$ depending on a predefined accuracy to be achieved;
or any mathematically equivalent formula.

As in the previous variant, a series expansion is used for approximating the reflectivity image. However, this time the reflectivity image is computed in a pseudo-spherical coordinate system. The different terms of the series are computed up to the predefined order $P_{max}$ and these terms are then summed up (if $P_{max} \geq 1$). The method is going to be referred to as the far-field pseudo-spherical format algorithm, also abbreviated FPFA since it will be clear from the context whether a pseudo-polar or a pseudo-spherical coordinate system is considered. In practice, a zeroth order series may be sufficient for obtaining a good approximation of the reflectivity on the pseudo-spherical grid. In this case, $P_{max}=0$ and thus $$I_p(\alpha_{m'}, \beta_{n'}, \gamma_{k'}) \approx FFT3D[D(f_m, x'_n, y'_k)]. \qquad (7)$$

The individual terms of the image series may be evaluated concurrently and separately (e.g. using a parallel multi-processor system).

The radar array positions are preferably defined by $x'_n = -L_x/2 + n \cdot \Delta x'$ along the first axis, where $L_x$ represents a length of the radar array along the first axis and $\Delta x'$ the spacing between the radar array positions along the first axis, and by $y'_k = -L_y/2 + k \cdot \Delta y'$ along the second axis, where $L_y$ represents a length of the radar array along the second axis and $\Delta y'$ the spacing between the radar array positions along the second axis. The pseudo-spherical coordinate system is implicitly determined by the 3D Fourier transform, the radar array positions $(x'_n, y'_k)$ and the frequencies $f_m$. With an appropriate choice of the origin of the pseudo-spherical coordinate system, the points $\alpha_m$, m'=0 ... M-1, $\beta_n$, n'=0 ... N-1, and $\gamma_k$, k'=0 ... K-1, of the regular grid in the pseudo-spherical coordinate system may, for instance, be expressed by $\alpha_{m'}$=m'/B, m'=0 ... M-1, $\beta_{n'}$=n'/L$_x$-(N-1)/(2L$_x$), n=0 ... N-1, and $\gamma_{k'}$=k'/L$_y$-(K-1)/(2L$_y$).

The order $P_{max}$ of the series expansion is preferably chosen depending on the ratios of the radar array lengths $L_x$ and $L_y$ to range resolution: the larger the ratios $L_x/\delta_r$ and $L_y/\delta_r$, the more terms one preferably uses in the series to guarantee the accuracy of the reflectivity image. As for the previously discussed variant, the number of terms does not depend on the center frequency of the radar.

Preferably, subsequent computation steps using the reflectivity image are carried out in the pseudo-spherical coordinate system, e.g. the computation of a coherence image and/or a 3D phase interferogram. Most preferably, a transformation of the reflectivity image, the coherence image and/or the 3D phase interferogram into a coordinate system that is more convenient for visualizing the information, e.g. a spherical or Cartesian coordinate system, is carried out only after the substantial computations (of the reflectivity image, the coherence image and/or the 3D phase interferogram) have been achieved in the pseudo-spherical coordinate system. In this way, errors introduced into the data through the mapping of the computed image onto a spherical or Cartesian grid by interpolation or any other suitable procedure only affect the visualization but not the substantial calculations. No computationally costly interpolation is required before any Fourier transform.

Both variants of the invention may be applied for computing a radar reflectivity image in or nearly in real time.

An aspect of the invention concerns a computer program product for controlling a data processing apparatus, e.g. a computer, a microprocessor, a parallel multiple-processor system, and the like, comprising instructions causing the data processing apparatus to carry out the FPGA when executed on the data processing apparatus.

BRIEF DESCRIPTION OF THE DRAWINGS

Further details and advantages of the present invention will be apparent from the following detailed description of not limiting embodiments with reference to the attached drawings, wherein.

DETAILED DESCRIPTION

Figure 1:
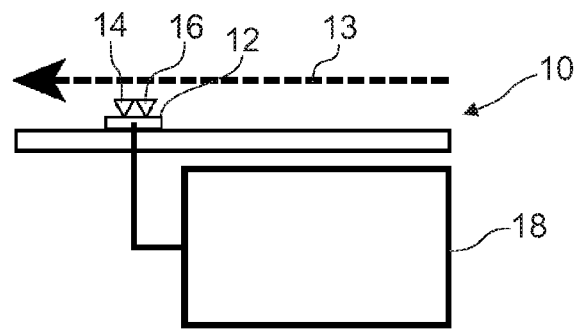
FIG. 1 is a schematic side view of an SAR.
Figure 2:
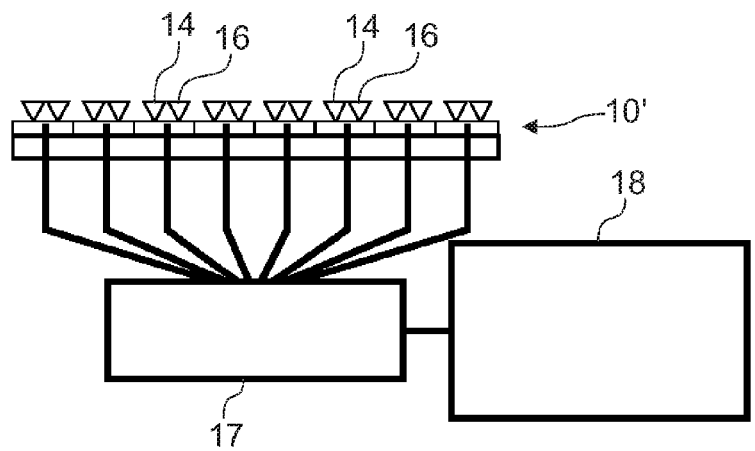
FIG. 2 is a schematic side view of a physical radar array.

The far-field pseudo-polar format algorithm can be used with an short imaging radar array having an array length $L_x$. This radar array 10, 10' can be either synthetic or physical, as shown in FIGS. 1 and 2. The aperture synthesis can be achieved through the controlled linear motion (indicated by the dashed arrow 13) of a single radar element 12 comprising a transmit antenna 14 and a receive antenna 16 (or a single antenna for both transmission and reception) connected to a radar transceiver 18. Alternatively, a physical radar aperture 10' can be provided in form of an array of transmit/receive antennas 14, 16 and a multiplexer unit 17 switching electronically through these antennas 14, 16.

Figure 3:
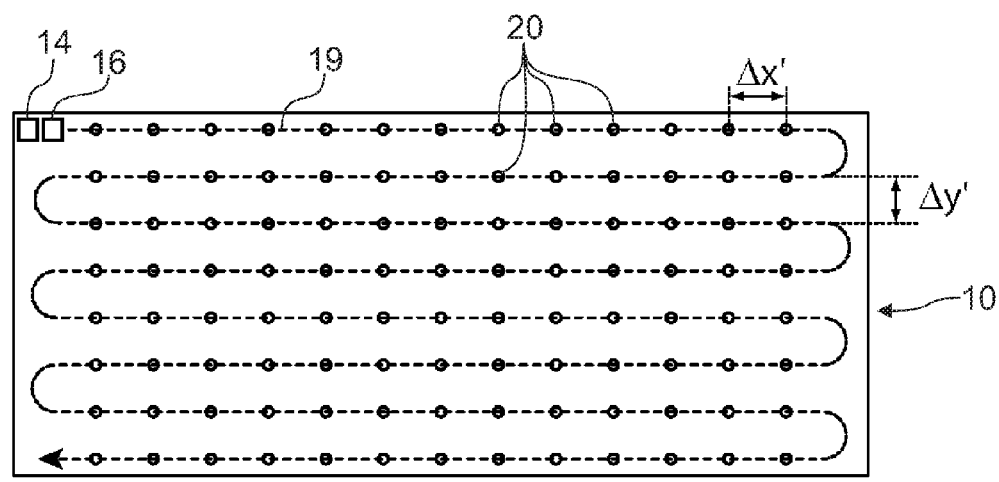
FIG. 3 is a front view of a 2D SAR.
Figure 4:
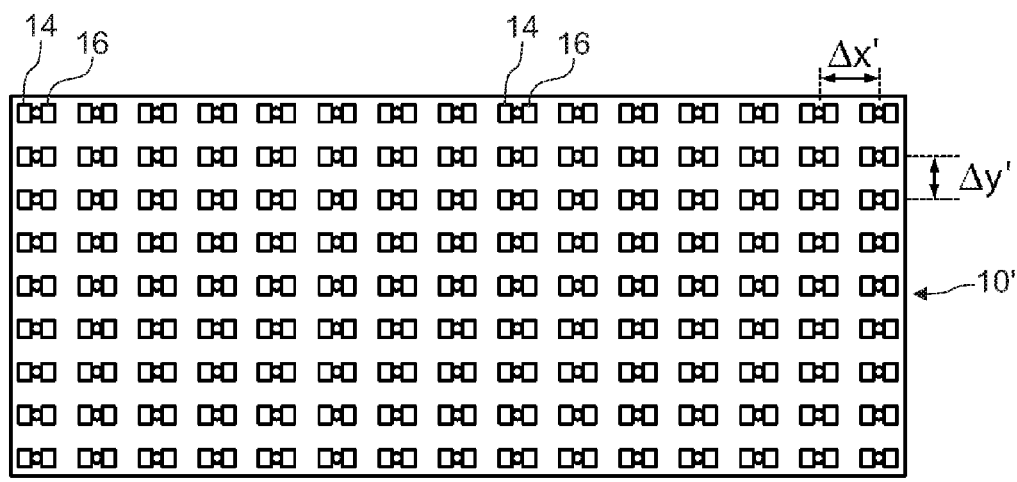
FIG. 4 is a schematic front view of a 2D physical radar array.
Figure 5:
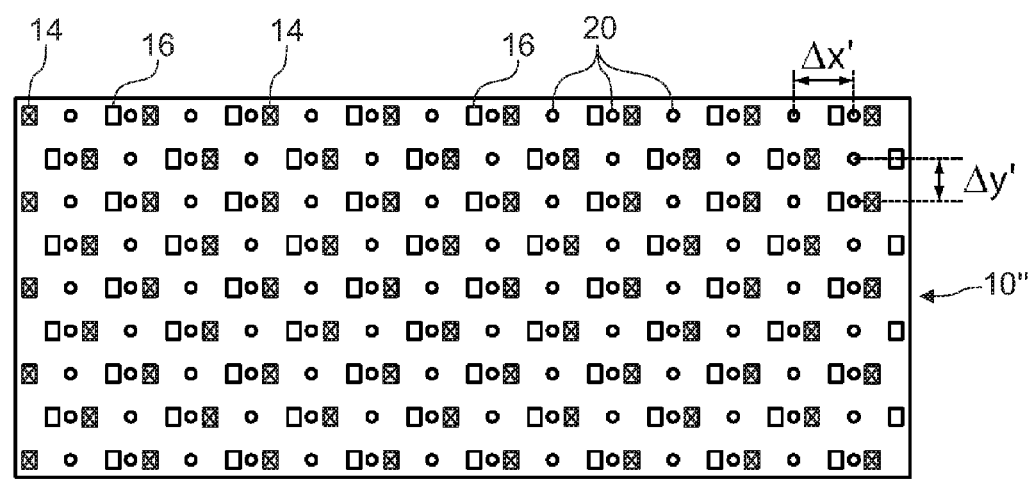
FIG. 5 is a is a schematic front view of a 2D MIMO radar array.

While FIGS. 1 and 2 show one-dimensional radar arrays, FIGS. 3-5 illustrate the case of a two-dimensional radar array. FIG. 3 shows a 2D-synthetic radar array 10 with a single radar element comprising a transmit antenna 14 and a receive antenna 16 (or a single antenna for both transmission and reception). During operation of the radar array, the radar element moves along a predefined path 19 and radar backscatter measurements are carried out at a plurality of positions 20, which are regularly distributed on the aperture area so as to define a regular grid. These radar array positions 20 are regularly spaced along a first axis ("x-axis") and a second axis ("y-axis"), which are perpendicular to one another. The spacings in direction of the first axis and the second axis are $\Delta x'$ and $\Delta y'$, respectively. The measurement points, i.e. the radar array positions 20, correspond to the phase centers of the moving transmit/receive antenna pair.

A first alternative to the synthetic 2D radar array of FIG. 3 is the physical radar array 10' of FIG. 4. A plurality of radar elements each having a transmitting 14 and a receiving 16 antenna or a single antenna for both transmission and reception, are arranged along the first and second array axes, with spacings $\Delta x'$ and $\Delta y'$, respectively. In a measurement with the radar array of FIG. 4, one records the radar echo sequentially with every radar array element using a multiplexer or a switching device. Due to the number of radar elements, a physical radar array is normally more expensive than a synthetic one. However, a physical radar array has the advantage of much shorter acquisition times.

A second alternative to the synthetic 2D radar array of FIG. 3 is the 2D MIMO (multiple input multiple output) radar array 10" of FIG. 5. A set of $S_{TX}$ transmitting antennas 14 and a set of $S_{RX}$ receiving antennas 16 are arranged so that the phase centers of all possible combinations of transmitting and receiving antennas are regularly distributed in the aperture area. With a MIMO radar array, one fires sequentially with all the transmitting antennas 14 and for each receiving antenna in this sequence, one records the radar echo with some or all receiving antennas 16. One thus has a total of maximally $S_{TX} \cdot S_{RX}$ measurements associated to the different phase centers (which are thus the measurement points 20, i.e. the radar array positions) on the aperture are. This array configuration comes at reasonable cost and complexity and offers short acquisition times.

Figure 6:
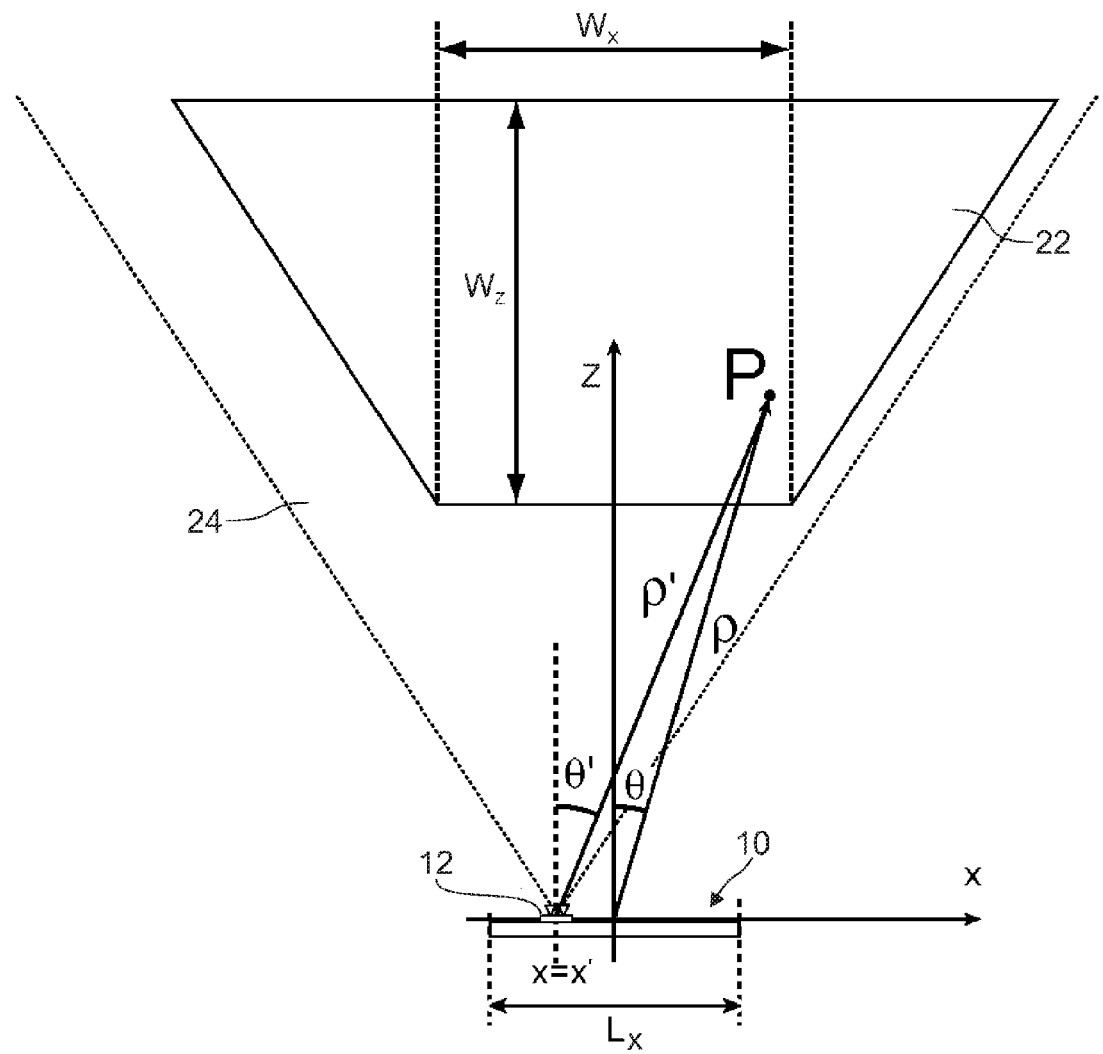
FIG. 6 is a top schematic view of a situation when a scene is radar-imaged.

In the following, the FPFA is first going to be discussed for the two-dimensional case with reference to FIG. 6 (which is not to scale).

The scene of interest 22 to be interested is assumed to be located within the far-field of the radar array (which is represented here, for illustration, as an SAR 10), i.e.:

$$\rho, \rho' > \frac{2L_x^2}{\lambda_c} \qquad (8)$$

where $\rho'$ denotes the range distance from a radar array position x=x' to an arbitrary point P within the scene 22. Similarly, $\rho$ denotes the range distance from the center of the radar aperture to the same point P. The proposed imaging technique requires the image scene to be located in the far-field. However, provided this condition is satisfied, the extent of the image scene (i.e. its widths $W_x$ and $W_z$ in x- and z-directions, respectively) is only limited by the field of view 24 of the individual antenna elements. The resulting cross-range resolution is expected to be highly sub-optimal. This is a point that distinguishes the proposed FPFA from the polar format or range-Doppler imaging algorithm, which can only be used with image extents much smaller than the range to the center of the scene.

To introduce the formulation of the FPFA algorithm the use of a stepped-frequency radar will be assumed. Note that this choice is made without loss of generality and the presented formulation could also be used with a frequency-modulated continuous wave (CW) radar. Thus, we consider a CW signal radiated by a radar array element 12 located at array position x=x', which has a beam-width sufficiently large to irradiate the entire image area of interest. The backscatter signal is received at substantially the same position. For sake of the explanation of the algorithm, the scene is assumed to consist of a single point scatterer located at a point P, with polar coordinates ($\rho$, $\theta$), as shown in FIG. 2. The point's coordinates referred to the position of the radar element are ($\rho'$, $\theta'$). The radar array acquires the backscatter signal D(f, x') as a function of two parameters: the frequency f of the CW signal, and the position of the radar element on the array x'. The backscatter data are assumed to be sampled uniformly both in the frequency domain and the space domain along the axis of the array. Thus, a measurement with this radar will give as a result the following two-dimensional matrix of complex values D($f_m$, $x'_n$) with:

$$f_m = f_c - B/2 + m\Delta f \quad (9)$$

$$x'_n = -L_x/2 + n\Delta x' \quad (10)$$

where m=0, 1, ..., M−1, n=0, 1, ..., N−1, $f_c$ is the center frequency, B is the frequency bandwidth swept in the measurement, $\Delta f$ is the frequency step, M is the number of frequencies measured, $\Delta x'$ is the spacing between the radar array positions (i.e. the spacing between the physical radar array elements in case of a physical radar array, the phase centers of the different transmitting/receiving antenna combinations in case of a MIMO radar array, or the movement step used in the linear scan in the case of a synthetic array) and N is the number of measurement points along the radar aperture. As in any imaging algorithm based on a 2D Fourier transform, the steps in the frequency and radar position will have to be fine enough in order to avoid ambiguities both in range and cross-range directions.

The synthesis of a radar image can be achieved by coherently summing the signal contributions relative to different radar positions and CW frequencies. This technique is known as frequency domain wavefront back-propagation. Thus, with the imaging geometry of FIG. 6, the radar reflectivity at the point P can be estimated as follows in the case of a exp(+j 2$\pi$ f t) time dependence:

$$I(\rho, \theta) = \sum_{m=0}^{M-1} \sum_{n=0}^{N-1} D(f_m, x'_n) \exp\left[+j \frac{4\pi f_m}{c} \rho'_n\right] \quad (11)$$

where c is the speed of light and $$\rho'_n = \sqrt{(\rho \sin\theta - x'_n)^2 + \rho^2 \cos^2\theta} \quad (12)$$

The synthesis of an entire reflectivity image using eq. (11) has associated a high computational cost, which is O(MNM'N'), where M' and N' denote the number of pixels in the x and z directions, respectively. The algorithm of eq. (5) is known as the frequency-domain back-propagation algorithm (FDBA). The back-propagation algorithm can also be formulated in the time domain. The associated computational cost of this algorithm is O(N N' M $\log_2$M), which is significantly lower than that of its frequency domain implementation. In practice, the time domain implementation is that most commonly used with highly sub-optimal aperture lengths. The formulation of the time-domain back-propagation algorithm (TDBA) can be written as:

$$I(\rho, \theta) = \sum_{n=0}^{N-1} D_t\left(t = \frac{2\rho'_n}{c}, x'_n\right) \quad (13)$$

where $D_t$(t, x') denotes the frequency to time Fourier transform of the frequency domain backscatter data D(f, x'). The TDBA has associated a 1D interpolation prior to the azimuth compression. Typically, an FFT with zero-padding (to increase substantially the sampling frequency in the time domain) and a Lagrange interpolation are used. Later we will consider the resulting imagery obtained with the TDBA in eq. (13) as the reference to assess the quality of the FPFA imagery.

Since the point P is in the far-field of the radar aperture, we can approximate the range distance $\rho'$ using the binomial expansion as follows:

$$\rho' \approx \rho - x' \sin\theta + \frac{x'^2 \sin^2\theta}{2\rho} + \frac{x'^3 \sin\theta \cos^2\theta}{2\rho^2} + \ldots \quad (14)$$

whose higher order terms become less significant provided $\rho$, $\rho \gg L_x$. At this point, we will make use of the first-order far-field approximation of a dipole radiator, which is well known in antenna measurements:

$$\rho' \approx \rho - x' \sin\theta \quad (15)$$

Thus, the radar reflectivity at point P in eq. (11) can now be re-written as:

$$I(\rho, \theta) \approx \sum_{m=0}^{M-1} \sum_{n=0}^{N-1} D(f_m, x'_n) \exp\left[+j \frac{4\pi f_m}{c}(\rho - x' \sin\theta)\right] \quad (16)$$

which, considering that $$f_m = f_c + \hat{f}_m \quad (17)$$

where $$\hat{f}_m = -B/2 + m\Delta f \quad (18)$$

is the baseband frequency term, can be re-written as:

$$I(\rho, \theta) \approx \quad (19)$$

$$\sum_{m=0}^{M-1} \sum_{n=0}^{N-1} D(f_m, x'_n) \exp\left[+j 2\pi \left(f_m \frac{2\rho}{c} - x' \frac{2\sin\theta}{\lambda_c}\right)\right] \exp\left[+j 2\pi x'_n \hat{f}_m \frac{2\sin\theta}{c}\right]$$

wherein the first exponential is the kernel of a 2D Fourier transform. Examining the behavior of the second exponential, one finds the bounds:

$$|\Psi_{mn}| = \left|2\pi x'_n \hat{f}_m \frac{2\sin\theta}{c}\right| \leq \frac{\pi L \sin\theta}{2\delta_r} \quad (20)$$

where $\delta_r = c/(2B)$ denotes the range resolution. The maximum values of $|x'_n|$ and $|\hat{f}_m|$ used in eq. (20) are L/2 and B/2, respectively. Because of the presence of the sin θ factor and the fact that the mean values $\langle x'_n \rangle$ and $\langle \hat{f}_m \rangle$ are both null, the effective bounds of $\psi_{mn}$ are in practice much smaller than those given in eq. (20). A Taylor expansion of the last exponential in eq. (19) yields:

$$\exp[-j\Psi_{mn}] \approx \sum_{p=0}^{\infty} \frac{1}{p!} \left[\frac{-j4\pi x'_n \hat{f}_m \sin\theta}{c}\right]^p \quad (21)$$

Since $\psi_{mn}$ is a range-independent phase modulation term, we can predict that any truncation error in the above expansion will result into a range-independent image deblurring effect increasing with increasing θ. No deblurring is observed at θ=0. To reformulate eq. (19) with 2D FFTs, the pseudo-polar coordinate system determined by the kernel of the 2D Fourier transform in eq. (19) is used. The pseudo-polar coordinate system is defined with the two variables:

$$\alpha = \frac{2\rho}{c} \quad (22)$$

$$\beta = \frac{2\sin\theta}{\lambda_c}$$

which clearly resemble a polar coordinate system with ρ and θ as the radial and angular variable, respectively. The α coordinate is directly proportional to the range coordinate of a polar grid. The β coordinate is a sinusoidal function of the polar angle θ with amplitude $2/\lambda_c$. For a narrow field of view of the radar (i.e. if θ<<1), then $\beta \approx 2\theta/\lambda_c$ and becomes also proportional to the polar coordinate θ. The reverse transformation from the pseudo-polar to the polar coordinate system is straightforward and can be formulated as follows:

$$\rho = \frac{c}{2}\alpha \quad (23)$$

$$\theta = \arcsin\left[\frac{\lambda_c}{2}\beta\right]$$

and the corresponding ground-range and cross-range coordinates in the Cartesian grid are, respectively:

$$x = \rho \sin\theta$$

$$y = \rho \cos\theta \quad (24)$$

Figure 7:
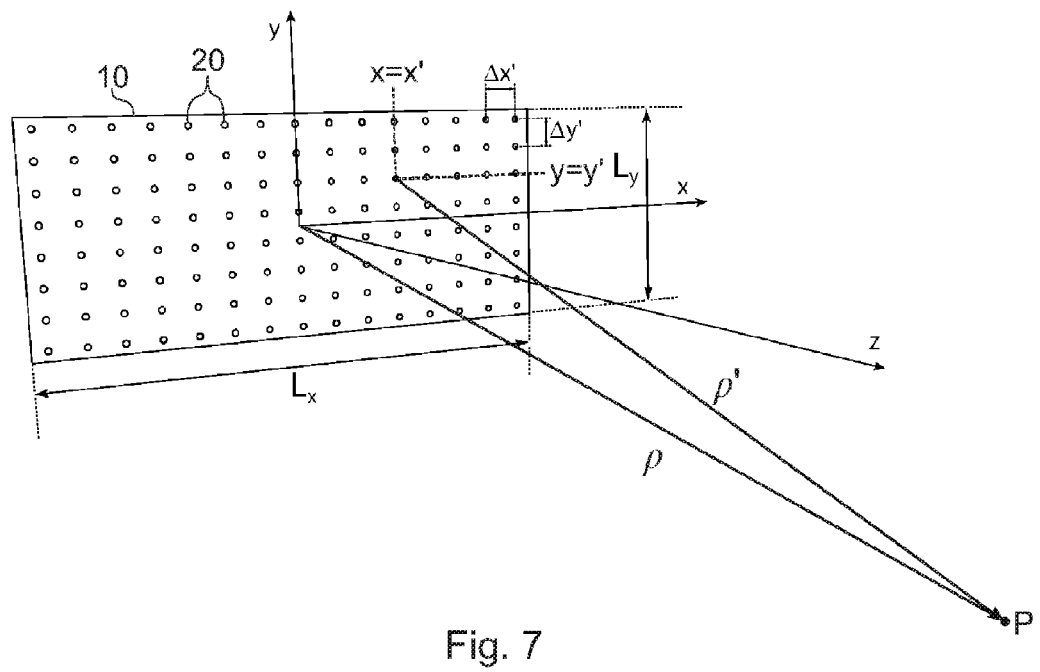
FIG. 7 is a schematic perspective view of a situation when a scene is imaged with a 2D radar array.

An example of 2D grid uniformly sampled in α and β ($\lambda_c$=5 cm) with the corresponding pseudo-polar and Cartesian grids is shown in FIG. 7. As can be seen, the uniform grid in the pseudo-polar coordinate system highly resembles a polar grid. However, an important advantage of the suggested pseudo-polar format is that the resulting images will show an invariant resolution within the entire image scene. These resolutions are $\delta_\alpha=1/B$ and $\delta_\beta=1/L_x$, respectively. Invariant resolution is not given in a polar formatted image, where the azimuth resolution is a decreasing function of θ, except when the image is resampled by appropriate interpolation at the price of introducing interpolation errors. Consequently, it is a good practice to use the pseudo-polar format at all stages of the processing chain but the last one where the image has to be geo-located and/or displayed in a coordinate system more convenient for visualization. Products such as the radar reflectivity image, coherence images, and 2D phase interferograms can also be computed in the pseudo-polar format.

Regarding the transformation from the pseudo-polar to either polar or Cartesian grids, it can e.g. be implemented using any suitable technique, e.g. a 2D Lagrange interpolation. Such transformations are well known and need not be explained. Details concerning their implementation can be found in the relevant literature (see e.g.).

Using the above results, The radar reflectivity at the point P of eq. (19) expressed in the pseudo-polar coordinate system becomes:

$$I(\alpha, \beta) = \sum_{p=0}^{\infty} \frac{1}{p!} \left[\frac{-j2\pi\beta}{f_c}\right]^p \quad (25)$$

$$\sum_{m=0}^{M-1} \sum_{n=0}^{N-1} D(f_m, x'_n)(\hat{f}_m x'_n)^p \times \exp[+j2\pi(f_m\alpha - x'_n\beta)]$$

To simplify the notation, the following 2D Fourier transform pair is introduced:

$$H_p(\alpha_{m'}, \beta_{n'}) \Leftrightarrow D(f_m, x'_n)(\hat{f}_m x'_n)^p \quad (26)$$

where the symbol ⇔ denotes the 2D FFT operator, with m, m'=0, ..., M−1, and n, n'=0, ..., N−1. Finally, the reflectivity image can be expressed as a series expansion of the function $H_p(\alpha_{m'}, \beta_{n'})$ as follows:

$$I(\alpha_{m'}, \beta_{n'}) = \sum_{p=0}^{\infty} I_p(\alpha_{m'}, \beta_{n'}) \quad (27)$$

with $$I_p(\alpha_{m'}, \beta_{n'}) = \frac{1}{p!} \left[\frac{-j2\pi\beta_{n'}}{f_c}\right]^p H_p(\alpha_{m'}, \beta_{n'}). \quad (28)$$

In practice, only a limited number of terms ($P_{max}+1$) can be summed, which yields equations (2) and (3). When the radar aperture has a dimension comparable to the range resolution (i.e. $L_x \approx \delta_r$), which is quite a common scenario, a zeroth order series expansion in eq. (27) suffices (i.e. $P_{max}=0$ in eq. (2)), and an excellent estimate of the image reflectivity in the pseudo-polar grid can be obtained through a single 2D FFT, yielding eq. (4):

$$I(\alpha_{m'}, \beta_{n'}) \approx I_0(\alpha_{m'}, \beta_{n'}) = H_0(\alpha_{m'}, \beta_{n'}) = FFT2D[D(f_m, x'_n)]$$

Figure 9:
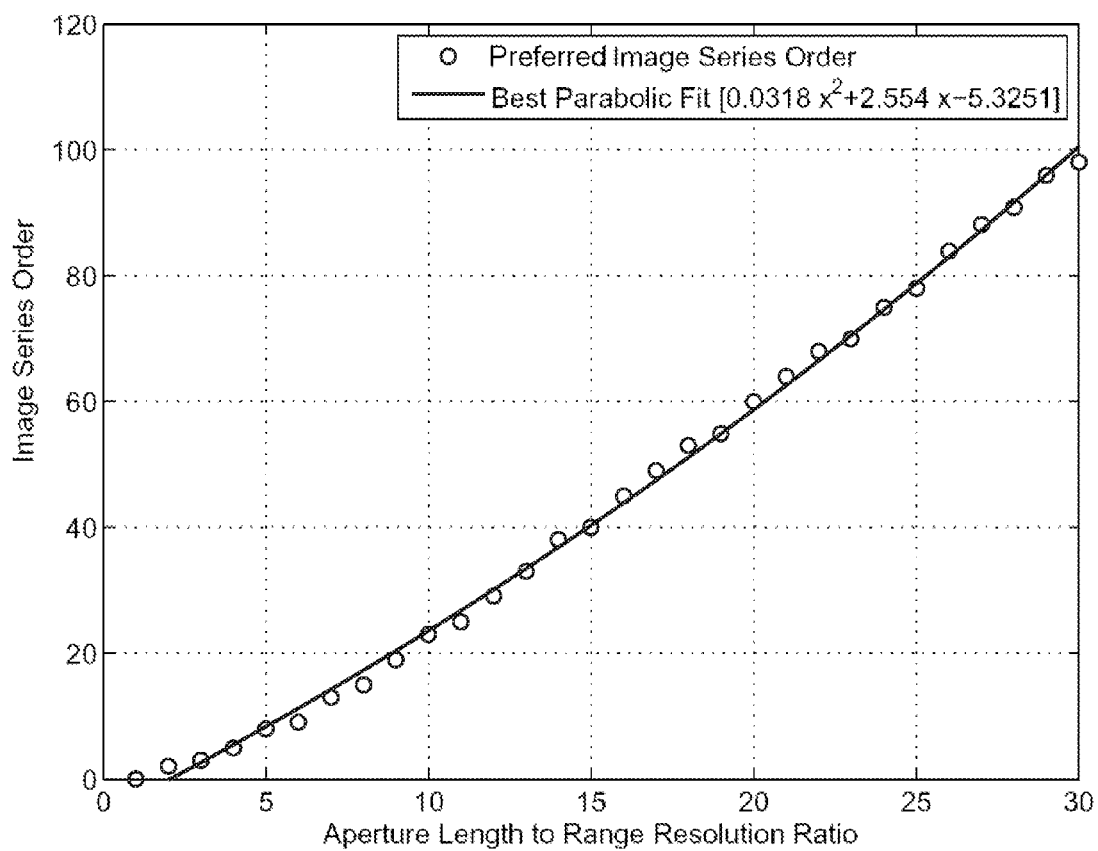
FIG. 9 is a diagram showing the preferred order of the image series expansion as a function of aperture length to range resolution.

The addition of more terms in the series expansion, all of them being evaluated with 2D FFTs, is straightforward and does not significantly increase the computational cost. Furthermore, a separate and concurrent evaluation of every single term of the image series is perfectly possible (e.g. using parallel multi-processor systems). The rule is that the larger the ratio $L_x/\delta_r$ is, the more terms in the series should be used to guarantee the convergence of the FPFA series expansion. The diagram of FIG. 9 indicates the preferred cutoff order $P_{max}$ of the series expansion when the image is to be evaluated numerically, as a function of the aperture length to range resolution ratio $L_x/\delta_r$. $P_{max}$ can be determined e.g. using FIG. 9, a look-up table (containing the values of FIG. 9) or by evaluating a fit function (e.g. $f(x)=0.0318x^2+2.554x+5.3251$, where x stands here for $L_x/\delta_r$) and rounding up or down to the next integer.

For the sake of completeness, we give an alternative form of eq. (27) that is obtained exploiting the derivative property of the Fourier transform:

$$I(\alpha_{m'}, \beta_{n'}) \approx \sum_{p=0}^{\infty} \left[\frac{-j\beta_{n'}}{2\pi f_c}\right]^p \frac{\partial^p}{\partial^p \beta_{n'}} \sum_{k=0}^{p} \binom{p}{k} (-f_c)^k \frac{\partial^{p-k} I_0(\alpha_{m'}, \beta_{n'})}{\partial^{p-k} \alpha_{m'}} \quad (29)$$

which is not used in practice, but is useful to illustrate the fact that the series terms $I_p(\alpha_m, \beta_n)$ with $p \geq 1$ are partial derivatives of the first term (i.e. the zeroth order term) of the series expansion. Under the condition of having a range resolution comparable to the aperture length, these additional terms show in general reflectivities much lower than those of the zeroth order term (typically 30-40 dB below) and thus do not introduce any noticeable artifacts into the imagery. If, however, the ratio of aperture length to range resolution $L_x/\delta_r$ is large, additional terms in the series may be needed to obtain a more precise estimate of the reflectivity image.

The above derivation of the FPFA for a linear radar array can mutatis mutandis be applied for the case of a 2D radar array. A sketch of that imaging scenario is shown in FIG. 7. The radar array lies in the xy-plane and has the lengths $L_x$ and $L_y$ in x-direction and y-direction, respectively. The measurement points 20 (radar array positions) are indicated by the circles in the radar aperture 10. The spacings of the measurement points along the x and y axes are $\Delta x'$ and $\Delta y'$, respectively. At each measurement point 20, backscatter data are sampled in the frequency domain with a frequency spacing of $\Delta f$. A measurement with such radar yields a 3D matrix of complex-valued backscatter data $D(f_m, x'_n, y'_k)$ with:

$f_m = f_c - B/2 + m\Delta f$ $x'_n = -L_x/2 + n\Delta x'$ $y'_k = -L_y/2 + n\Delta y'$ (30)

where $m=0, 1, \ldots, M-1$, $n=0, 1, \ldots, N-1$, $k=0, 1, \ldots K-1$, $f_c$ is the center frequency, B is the frequency bandwidth swept in the measurement, M is the number of frequencies measured, and N and K are the number of radar array positions in x and y directions, respectively. As in any imaging algorithm based on a 3D Fourier transform, the steps in the frequency domain and the two radar axes have to be fine enough to avoid ambiguities in range and cross-range directions.

Under the assumption of having a 3D image scene entirely in the far-field of the 2D radar array (i.e. $\rho \gg 2L_x^2/\lambda_c$ and $\rho \gg 2L_y^2/\lambda_c$), the 3D reflectivity image in the pseudo-spherical coordinate system can be expressed as:

$$I(\alpha_{m'}, \beta_{n'}, \gamma_{k'}) = \quad (31)$$

$$\sum_{p=0}^{P_{max}} \left[\frac{-j2\pi}{f_c}\right]^p \sum_{q=0}^{p} \frac{\beta_{m'}^q \gamma_{k'}^{p-q}}{q!(p-q)!} FFT3D[D(f_m, x'_n, y'_k)\hat{f}_m^p x'^q_n y'^{p-q}_k],$$

where $\hat{f}_m = f_m - f_c$ is the baseband sampling frequency.

Instead of a pseudo-polar coordinate system one has here a pseudo-spherical coordinate system, with variables defined as $$\alpha = \frac{2\rho}{c} \quad (32)$$

$$\beta = \frac{2x}{\lambda_c \rho}$$

$$\gamma = \frac{2y}{\lambda_c \rho}$$

Every term of the image series expansion in eq. (31) is formatted on a 3D uniform grid along the $\alpha$, $\beta$ and $\gamma$ coordinates. The transformation from this coordinate system to a spherical or Cartesian coordinate system can be achieved using the following expressions:

$$\rho = \frac{2}{c}\alpha \quad (33)$$

$$x = \left[\frac{\lambda_c \rho}{2}\beta\right]$$

$$y = \left[\frac{\lambda_c \rho}{2}\gamma\right]$$

$$z = \sqrt{\rho^2 - x^2 - y^2}$$

As concerns the preferred cutoff order $P_{max}$ of the series expansion in equation (31), it may be determined in a similar way as described with respect to the 2D case. $P_{max}$ depends on the aperture length to range resolution ratios $L_x/\delta_r$ and $L_y/\delta_r$. The preferred value of $P_{max}$ can be determined by selecting the larger of $L_x/\delta_r$ and $L_y/\delta_r$ and using, e.g. FIG. 9 or a look-up table (containing the values of FIG. 9), or by evaluating a fit function (e.g. $f(x)=0.0318x^2+2.554x+5.3251$, where x stands here for the larger of $L_x/\delta_r$ and $L_x/\delta_r$) and rounding up or down to the next integer.

EXAMPLES

A. Numerical Simulations

The FPFA has been validated with a series of numerically simulated scenarios (in the 2D case). As a first example, a scene consisting of 5×5 point scatterers uniformly distributed in range and azimuth, with 500 m<$\rho$<1500 m and −60 deg<$\theta$<60 deg, was generated. The range distance to the center of the scene was set to 1 km. The scatterer spacing in range and azimuth are, 250 m and 30 deg, respectively. The radar's center frequency was assumed to be 17.05 GHz (i.e. in the Ku-Band) and the bandwidth 100 MHz. The radar aperture was assumed to be 2 m long ($L_x=2$ m). The aperture length to range resolution is $L_x/\delta_r \approx 1.3$. Prior to the formation of the images, a four-terms Blackman-Harris window was applied both along frequency and the linear coordinate of the radar aperture dimensions. The reflectivity images were computed using the FPFA and, for comparison, the TDBA. In the FPFA, the first four terms of the image series in eq. (27), i.e., $I_p(\alpha, \beta)$ with $0 \leq p \leq 3$. The dynamic range of the images was 100 dB. From the results, it clearly followed that the first term of the image series, the zeroth order expansion, is already an excellent approximation of the true reflectivity. In fact, it was found that the second term in the series has reflectivity values, on a pixel by pixel basis, at least 25 dB below those of the first term. Similarly, the third term showed values at least 41 dB below those of the first term, which indicates that one can obtain an excellent imagery using the zeroth order series expansion. Comparing these results with those from the TDBA it was again confirmed that truncation error is negligible, and the zeroth order FPFA image is extremely close to that of the TDBA.

In a second simulated scenario the radar was assumed to have a much larger bandwidth, here B=1 GHz. The center frequency of the radar was chosen 5.5 GHz (i.e. in the C-Band). The aperture length was set to 3 m. This radar has a relative bandwidth of 20%, therefore it is fully classifiable as ultra-wide band according to the US FCC. The image scene this time was assumed to consist of seven point scatterers uniformly distributed in azimuth within −45 deg<θ<45 deg. The angular distance among scatterers is 15 deg and all of them were given the same reflectivity. The range distance to the scatterers was fixed to 600 m for all of them. As in the previous simulation, a four-terms Blackman-Harris window was used both in the frequency and radar aperture domains. In this example the aperture length to range resolution ratio is exactly $L_x/\delta_r=20$. It was expected that a larger number of terms in the image series expansion of eq. (27) would have to be used to guarantee convergence of the series. The FPFA reflectivity image was computed for a number of terms ranging from 1 ($P_{max}=0$, zeroth order expansion) to 65 ($P_{max}=64$). It could be observed that the alternating series of eq. (21) converges rapidly to a very precise reflectivity image when the order of the expansion is above $P_{max}\approx 50$. With smaller values of $P_{max}$ ($P_{max}\leq 48$), some artifacts located at large off-boresight angles were noted but these artifacts disappeared as the number of terms $P_{max}$ was further increased. It was noted that the zeroth order image series gives a reasonably good result. Images obtained with $P_{max}\geq 57$ were found to be in almost perfect agreement with those obtained with the TDBA.

B. GB-SAR Measurements

Figure 8:
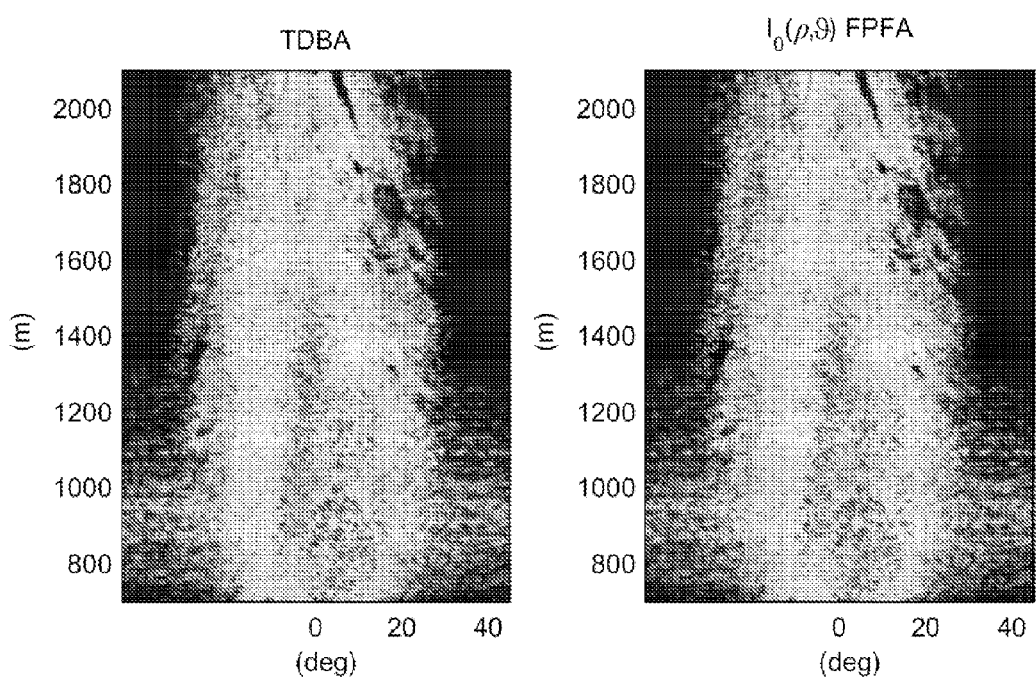
FIG. 8 shows a comparison of images, in polar coordinates, obtained with the TBDA and the zeroth order FPFA, respectively.

A first GB-SAR (Ground-based SAR) data set was collected in the framework of a field campaign at the avalanche test site of the Swiss Federal Institute for Snow and Avalanche Research (SLF-Davos), located in Vallee de la Sionne (Switzerland). A LISA (Linear SAR) instrument of the JRC was deployed to monitor the avalanche activity and assess the possible operational use of the GB-SAR technology. The center frequency used was 5.83 GHz, in the C-Band, with a frequency bandwidth of 60 MHz. The radar was based on a PNA network analyzer from Agilent Technologies working in the stepped frequency mode. The radar had two separate transmit and receive antennas and measured the VV polarization. The length of the synthetic radar aperture was 3.5 m. The typical avalanche path length on this site is 2.5 km, starting at an altitude of about 2650 m above sea level and ending at about 1450 m. The LISA instrument was positioned on the other site of the Valley at an altitude of 1800 m. The average slope within the image scene was about 27 deg. The range distance to the image scene went from 700 to 2100 m. The span of the image scene in azimuth angle was 90 deg. The aperture length to range resolution ratio in this case was $L_x/\delta_r\approx 1.4$, which indicated that a zeroth order expansion of the image series should suffice for obtaining decent accuracy. The number of frequency points and radar positions along the aperture fixed to guarantee an image scene free of any ambiguity are, respectively, M=1601 and N=251. In this campaign, the total measurement time needed for a single image acquisition was 9 minutes. The backscatter data were converted into reflectivitiy images using the FPFA and, for comparison, the TBDA. A four-terms Blackman-Harris window both in the frequency and radar's aperture domains was used. FIG. 8 shows the image resulting from the TBDA (left-hand side) and from the zeroth order FPFA (right-hand side) in polar coordinates. As can be seen, the image obtained with the zeroth order FPFA is indistinguishable from that obtained using the TBDA. The second term of the image series has also been evaluated. It was found that it has, on a pixel by pixel basis, a reflectivity at least 39 dB below those of the first term.

A second field campaign was carried out with a GB-SAR instrument deployed in a ski resort located in Alagna Valsesia (Italy, Piedmont Region). The area monitored was a very steep slope with 30 to 50 degrees of inclination, at an altitude ranging from 2300 to 2700 m. The bottom part of the image scene corresponds to the Olen Valley, where a ski track passes through putting under risk skiers when snow avalanches fall down. The goal of this campaign was that of automatically detecting any avalanche event occurring within the field of view of the GB-SAR instrument. The extent of the image scene was about one square km, and was located at range distances ranging from 750 to 1500 m from the radar array. The radar used was again based on a PNA network analyzer from Agilent Technologies working in the stepped frequency mode. The radar bandwidth used in this field campaign was 250 MHz, with a center frequency of 13.25 GHz (i.e. in the Ku-Band). The radar had two separate transmit and receive antennas and measured the VV polarization. The length of the aperture was 1.9 m. The aperture length to range resolution ratio is in this case $L_x/\delta_r\sim 3.1$, which is larger than in the previous example. The number of frequency points and radar positions along the aperture are, respectively, M=3201 and N=301. In this campaign, the total measurement time needed for a single image acquisition was 6 minutes. It was observed again that the zeroth order FPFA gave basically the same reflectivity image as the TBDA. This was because from the second term onwards the FPFA images in the series showed a very low reflectivity. On a pixel by pixel basis, the second term in the image series showed reflectivities at least 28 dB below those of the first term. This value is smaller than in the previous example, as was expected because of the larger aperture length to range resolution ratio.

It is worthwhile noting that the FPFA images computed in pseudo-polar or pseudo-spherical format can be interpolated onto a digital terrain model (DTM) of the image area of interest. For instance, two images collected immediately before and after an event (e.g. an avalanche) may be combined in the pseudo-polar or pseudo-spherical format into a coherence image, which may thereafter be interpolated onto a DTM with texture (e.g. an orthophoto) using the coordinates transformation given in eqs. (23) and (24). Such coherence image allows to readily identify changes caused by the event (e.g. the extent of an avalanche) because of the low coherence values in the affected area or areas.

Regarding practical use of the technique of the present invention, the FPFA may be implemented using any suitable software or hardware. So far the inventor has implemented and tested it using a number of commercial software packages including Matlab™ (The Mathworks, MA, USA), LabView™ (National Instruments, TX, USA), and IDL™ (ITT Visual Solutions, Boulder, Colo., USA), all of them giving excellent results. Of particular interest is the combination of these implementations and the FFTW library (i.e. the "fastest Fourier transform in the west" package developed at MIT by Frigo and Johnson). During tests with massive amounts of images it was concluded that the disk read (raw data) and write (radar image) operations were more time-consuming than the FPFA itself. Typical processing times for a single image (excluding read and write operations) were found to be in the order of a few tens of ms on an Intel Xeon™ 5160-3 GHz workstation.

The invention claimed is:

1. Method of radar-imaging a scene in a far-field of a one-dimensional radar array, comprising
providing an array of backscatter data of said scene, said backscatter data being herein denoted by $D(f_m, x'_n)$,
said backscatter data being associated to a plurality of radar array positions, herein denoted by $x'_n$, n=0 ... N−1, N>1, regularly spaced along an axis of said radar array;
the backscatter data being sampled, for each radar array position $x'_n$, at different frequencies, herein denoted by $f_m$, m=0 ... M−1, M>1, defined by $f_m=f_c-B/2+m\cdot\Delta f$, where $f_c$ represents a center frequency, B a bandwidth and $\Delta f$ a frequency step;
computing a radar reflectivity image, herein denoted by $I(\alpha_{m'}, \beta_{n'})$, in a pseudo-polar coordinate system, in which coordinates of a point of said scene are expressible by equations:

$$\alpha = \frac{2\rho}{c}$$
$$\beta = \frac{2x}{\lambda_c \rho}$$

where
$\alpha$ and $\beta$ denote coordinates of said point in said pseudo-polar coordinate system;
$\rho$ denotes a range distance from a center of the radar array to said point,
x denotes a coordinate, with respect to said axis, of an orthogonal projection of said point onto said one-dimensional radar array,
c denotes speed of light, and
$\lambda_c$ a centre wavelength,
said computing of said radar reflectivity image being effected on the basis of the following formula:

$$I(\alpha_{m'}, \beta_{n'}) = \sum_{p=0}^{P_{max}} I_p(\alpha_{m'}, \beta_{n'}),$$

with $$I_p(\alpha_{m'}, \beta_{n'}) = \frac{1}{p!}\left[\frac{-j2\pi\beta_{n'}}{f_c}\right]^p FFT2D\left[D(f_m, x'_n)(\hat{f}_m x'_n)^p\right],$$

where
j represents an imaginary unit,
$f_m = -B/2+m\cdot\Delta f$,
FFT2D denotes a 2D Fast Fourier Transform operator,
$\alpha_{m'}$, m'=0 ... M−1, and $\beta_{n'}$, n'=0 ... N−1 represent a regular grid in said pseudo-polar coordinate system, and $P_{max}$ is chosen ≥0 depending on an accuracy to be achieved;
wherein said providing an array of backscatter data of said scene and said computing a radar reflectivity image are carried out by an electronic computer processor device.

2. The method as claimed in claim 1, wherein said radar array positions are defined by $x'_n=-L_x/2+n\cdot\Delta x'$, where $L_x$ represents a length of the radar array and $\Delta x'$ a spacing between said radar array positions.

3. The method as claimed in claim 1, wherein $P_{max}$ is chosen depending on a ratio of radar array length to range resolution.

4. The method as claimed in claim 1, wherein said radar reflectivity image in said pseudo-polar coordinate system is mapped into at least one of a polar coordinate system and a Cartesian coordinate system.

5. The method as claimed in claim 1, wherein at least one of a coherence image and a 2D-phase interferogram is computed based upon said radar reflectivity image in said pseudo-polar coordinate system.

6. The method as claimed in claim 5, wherein said at least one of a coherence image and a 2D-phase interferogram is mapped into at least one of a polar coordinate system and a Cartesian coordinate system.

7. Method of radar-imaging a scene in a far-field of a two-dimensional radar array, comprising
providing an array of backscatter data of said scene, said backscatter data being herein denoted by $D(f_m, x'_n, y'_k)$,
said backscatter data being associated to a plurality of radar array positions, herein denoted by $(x'_n, y'_k)$ n=0 ... N−1, N>1, k=0 ... K−1, K>1, regularly spaced along a first and a second axis of said radar array;
the backscatter data being sampled, for each radar array position $(x'_n, y'_k)$ at different frequencies, herein denoted by $f_m$, m=0 ... M−1, M>1, defined by $f_m=f_c-B/2+m\cdot\Delta f$, where $f_c$ represents a center frequency, B a bandwidth and $\Delta f$ a frequency step;
computing a radar reflectivity image, herein denoted by $I(\alpha_{m'}, \beta_{n'}, \gamma_{k'})$, in a pseudo-spherical coordinate system, in which coordinates of a point of said scene are expressible by equations:

$$\alpha = \frac{2\rho}{c}$$
$$\beta = \frac{2x}{\lambda_c \rho}$$
$$\gamma = \frac{2y}{\lambda_c \rho}$$

where
$\alpha$, $\beta$ and $\gamma$ denote coordinates of said point in said pseudo-spherical coordinate system;
$\rho$ denotes a range distance from a center of the radar array to said point,
x denotes a coordinate, with respect to said first axis, of an orthogonal projection of said point onto said two-dimensional radar array,
y denotes a coordinate, with respect to said second axis, of said orthogonal projection of said point onto said two-dimensional radar array,
c denotes speed of light, and
$\lambda_c$ a centre wavelength,
said computing of said radar reflectivity image being effected on the basis of the following formula:

$$I(\alpha_{m'}, \beta_{n'}, \gamma_{k'}) = \sum_{p=0}^{P_{max}} I_p(\alpha_{m'}, \beta_{n'}, \gamma_{k'}),$$

with $$I_p(\alpha_{m'}, \beta_{n'}, \gamma_{k'}) = \left[\frac{-j2\pi}{f_c}\right]^p \sum_{q=0}^{p} \frac{\beta_{m'}^q \gamma_{k'}^{p-q}}{q!(p-q)!} FFT3D\left[D(f_m, x'_n, y'_k)\hat{f}_m^p x'^q_n y'^{p-q}_k\right],$$

where
j represents an imaginary unit,
$f_m = -B/2+m\cdot\Delta f$,
FFT3D denotes a 3D Fast Fourier Transform operator, $\alpha_{m'}$, m'=0 ... M−1, $\beta_{n'}$, n'=0 ... N−1 and $\gamma_{k'}$, k=0 ... K−1, represent a regular grid in said pseudo-spherical coordinate system, and $P_{max}$ is chosen $\geq 0$ depending on an accuracy to be achieved;

wherein said providing an array of backscatter data of said scene and said computing a radar reflectivity image are carried out by an electronic computer processor device.

8. The method as claimed in claim 7, wherein said radar array positions are defined by $x'_n = -L_x/2 + n \cdot \Delta x'$ along said first axis, where $L_x$ represents a length of the radar array along said first axis and $\Delta x'$ a spacing between said radar array positions along said first axis, and by $y'_k = -L_y/2 + k \cdot \Delta y'$ along said second axis, where $L_y$ represents a length of the radar array along said second axis and $\Delta y'$ a spacing between said radar array positions along said second axis.

9. The method as claimed in claim 7, wherein $P_{max}$ is chosen depending on ratios of radar array lengths along said first and said second axis to range resolution.

10. The method as claimed in claim 7, wherein said radar reflectivity image in said pseudo-spherical coordinate system is mapped into at least one of a spherical coordinate system and a Cartesian coordinate system.

11. The method as claimed in claim 7, wherein at least one of a coherence image and a 3D-phase interferogram is computed based upon said radar reflectivity image in said pseudo-spherical coordinate system.

12. The method as claimed in claim 11, wherein said at least one of a coherence image and a 3D-phase interferogram is mapped into at least one of a spherical coordinate system and a Cartesian coordinate system.

13. The method as claimed in claim 1, wherein said reflectivity image is computed in or nearly in real time.

14. The method as claimed in claim 7, wherein said reflectivity image is computed in or nearly in real time.

15. A computer program product for controlling a data processing apparatus, the computer program product embodied in a non-transitory computer-readable medium and comprising instructions causing said data processing apparatus to carry out a method of radar-imaging a scene in a far-field of a one-dimensional radar array when executed on said data processing apparatus, said method comprising:

providing an array of backscatter data of said scene, said backscatter data being herein denoted by $D(f_m, x'_n)$, said backscatter data being associated to a plurality of radar array positions, herein denoted $x'_n$, n=0 ... N−1, N>1, regularly spaced along an axis of said radar array;

the backscatter data being sampled for each radar array position $x'_n$ at different frequencies, herein denoted by $f_m$, m=0 ... M−1, M>1, defined by $f_m = f_c - B/2 + m \cdot \Delta f$, where $f_c$ represents a center frequency, B a bandwidth and $\Delta f$ a frequency step;

computing a radar reflectivity image, herein denoted by $I(\alpha_{m'}, \beta_{n'})$, in a pseudo-polar coordinate system, in which coordinates of a point of said scene are expressible by equations:

$$\alpha = \frac{2\rho}{c}$$

$$\beta = \frac{2x}{\lambda_c \rho}$$

where $\alpha$ and $\beta$ denote coordinates of said point in said pseudo-polar coordinate system;

$\rho$ denotes a range distance from a center of the radar array to said point, x denotes a coordinate, with respect to said axis, of an orthogonal projection of said point onto said one-dimensional radar array, c denotes speed of light, and $\lambda_c$ a centre wavelength, said computing of said radar reflectivity image being effected on the basis of the following formula:

$$I(\alpha_{m'}, \beta_{n'}) = \sum_{p=0}^{P\max} I_p(\alpha_{m'}, \beta_{n'}), \text{ with}$$

$$I_p(\alpha_{m'}, \beta_{n'}) = \frac{1}{p!}\left[\frac{-j2\pi\beta_{n'}}{f_c}\right]^p FFT2D\left[D(f_m, x'_n)(\hat{f}_m x'_n)^p\right],$$

where j represents an imaginary unit, $\hat{f}_m = -B/2 + m \cdot \Delta f$,

FFT2D denotes a 2D Fast Fourier Transform operator, $\alpha_{m'}$, m'=0 ... M−1, and $\beta_{n'}$, n'=0 ... N−1 represent a regular grid in said pseudo-polar coordinate system, and $P_{max}$ is chosen $\geq 0$ depending on an accuracy to be achieved;

wherein said providing an array of backscatter data of said scene and said computing a radar reflectivity image are carried out by an electronic computer processor device.

16. A computer program product for controlling a data processing apparatus, the computer program product embodied in a non-transitory computer-readable medium and comprising instructions causing said data processing apparatus to carry out a method of radar-imaging a scene in a far-field of a two-dimensional radar array when executed on said data processing apparatus, said method comprising:

providing an array of backscatter data of said scene said backscatter data being herein denoted by $D(f_m, x'_n, y'_k)$, said backscatter data being associated to a plurality of radar array positions, herein denoted by $(x'_n, y'_k)$ n=0 ... N−1 N>1, k=0 ... K−1 K>1, regularly spaced along a first and a second axis of said radar array;

the backscatter data being sampled, for each radar array position $(x'_n, y'_k)$ at different frequencies, herein denoted by $f_m$, m=0 ... M−1, M>1, defined by $f_m = f_c - B/2 + m \cdot \Delta f$, where $f_c$ represents a center frequency, B a bandwidth and $\Delta f$ a frequency step;

computing a radar reflectivity image herein denoted by $I(\alpha_{m'}, \beta_{n'}, \gamma_{k'})$, in a pseudo-spherical coordinate system, in which coordinates of a point of said scene are expressible by equations:

$$\alpha = \frac{2\rho}{c}$$

$$\beta = \frac{2x}{\lambda_c \rho}$$

$$\gamma = \frac{2y}{\lambda_c \rho}$$

where $\alpha$, $\beta$ and $\gamma$ denote coordinates of said point in said pseudo-spherical coordinate system;

$\rho$ denotes a range distance from a center of the radar array to said point, x denotes a coordinate, with respect to said first axis, of an orthogonal projection of said point onto said two-dimensional radar array, y denotes a coordinate, with respect to said second axis, of said orthogonal projection of said point onto said two-dimensional radar array, c denotes speed of light, and $\lambda_c$ a centre wavelength, said computing of said radar reflectivity image being effected on the basis of the following formula:

$$I(\alpha_{m'}, \beta_{n'}\gamma_{k'}) = \sum_{p=0}^{P_{max}} I_p(\alpha_{m'}, \beta_{n'}\gamma_{k'}), \text{ with}$$

$$I_p(\alpha_{m'}, \beta_{n'}\gamma_{k'}) =$$

$$\left[\frac{-j2\pi}{f_c}\right]^p \sum_{q=0}^{p} \frac{\beta_{m'}^q \gamma_{k'}^{p-q}}{q!(p-q)!} FFT3D\left[D(f_m, x'_n, y'_k)\hat{f}_m^p x_n^{\prime q} y_k^{\prime p-q}\right],$$

where
- j represents an imaginary unit,
- $\hat{f}_m = -B/2 + m \cdot \Delta f$,
- FFT3D denotes a 3D Fast Fourier Transform operator,
- $\alpha_{m'}$, m'=0...M−1, $\beta_{n'}$, n'=0...N−1 and $\gamma_{k'}$, k=0...K−1, represent a regular grid in said pseudo-spherical coordinate system,
- and $P_{max}$ is chosen $\geqq 0$ depending on an accuracy to be achieved;

wherein said providing an array of backscatter data of said scene and said computing a radar reflectivity image are carried out by an electronic computer processor device.

* * * * *